Jan. 5, 1932.  H. R. ARNOLD  1,839,726
CIRCULAR RETRACTOR
Filed Aug. 1, 1930   2 Sheets-Sheet 1
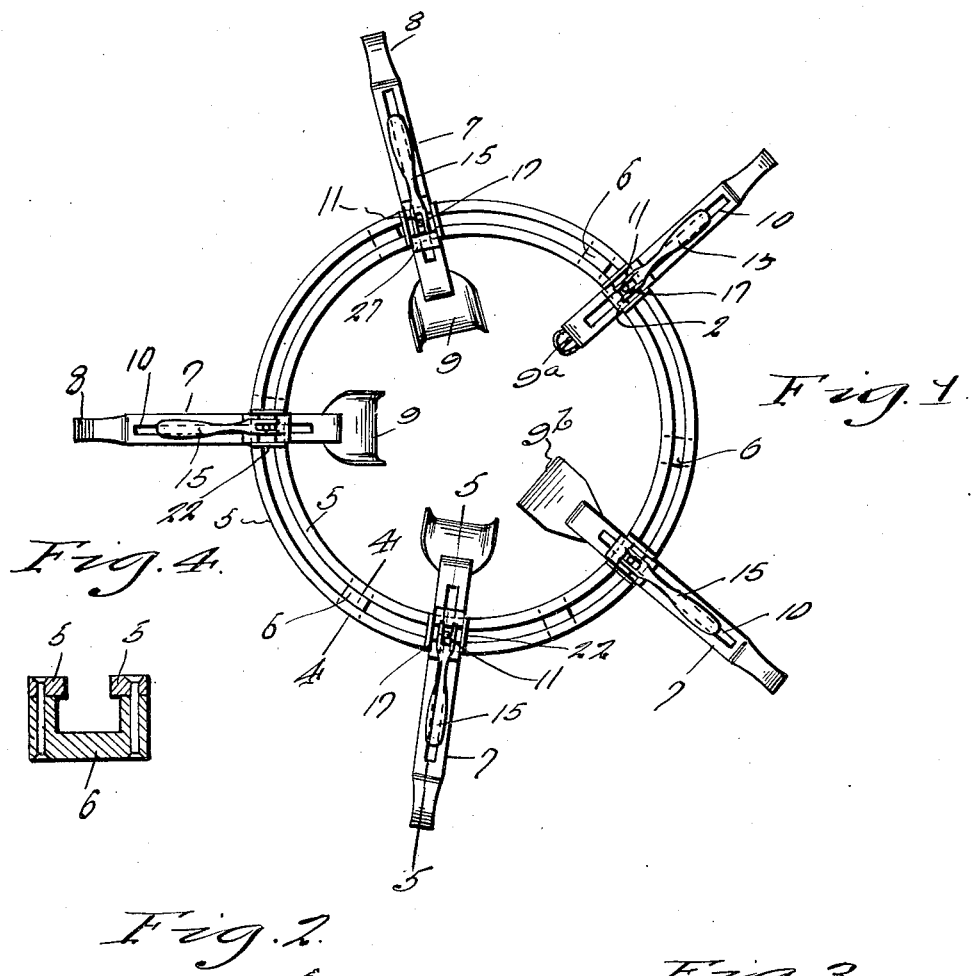
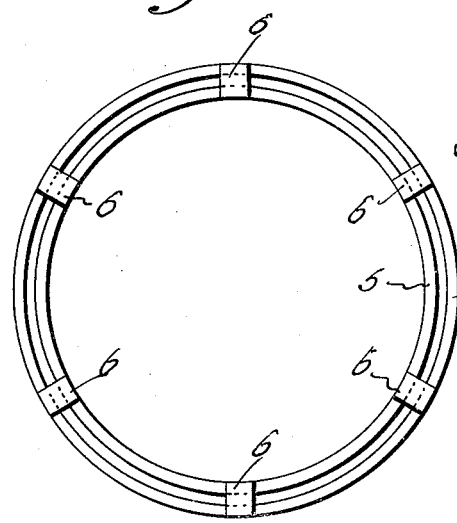
Inventor
Hubert R. Arnold
By Clarence A. O'Brien
Attorney Jan. 5, 1932.  H. R. ARNOLD  1,839,726
CIRCULAR RETRACTOR
Filed Aug. 1, 1930  2 Sheets-Sheet 2
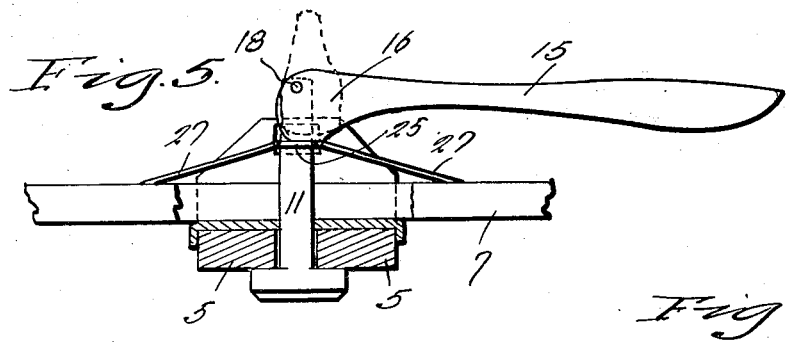
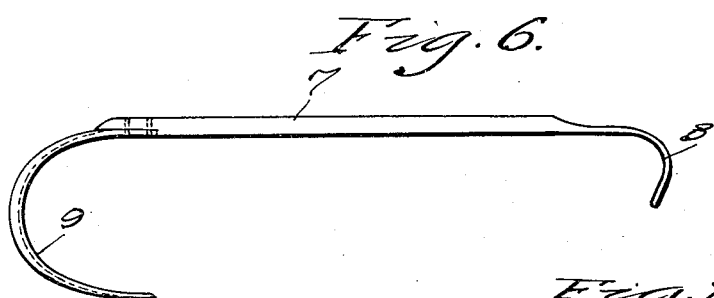
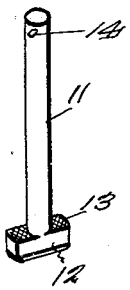
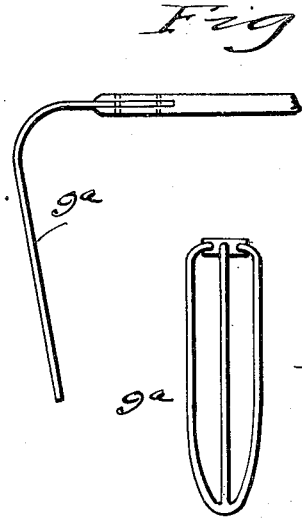
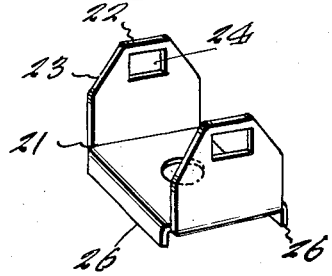
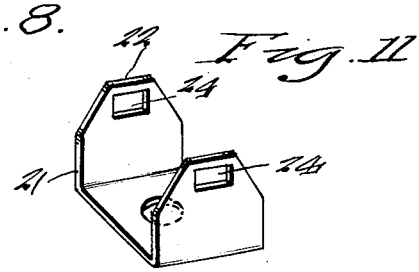
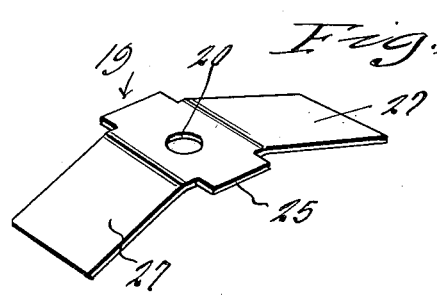
Inventor
Hubert R. Arnold
By Clarence A. O'Brien
Attorney Patented Jan. 5, 1932

1,839,726

UNITED STATES PATENT OFFICE

HUBERT R. ARNOLD, OF SAN FRANCISCO, CALIFORNIA

CIRCULAR RETRACTOR

Application filed August 1, 1930. Serial No. 472,390.

This invention relates generally to surgical appliances for use when operating upon the abdomen for retracting the walls of the abdomen about the incision and for maintaining the organs in desired position, while operating.

The invention has special relation to devices of this kind employing adjustable hooks for engaging and retracting the walls of the abdomen and adjustable means for retaining them in adjustable positions, and other adjustable means for flexibly maintaining the organs in the required position, and said hooks and said organ contacting means being formed upon a frame.

It is the purpose of the invention to provide a device of the character described, which embodies a circular frame adapted to be disposed in any desired angle.

It is further an object of the invention to provide a novel adjustable clamp which is adapted to be mounted upon the individual retractors and mount the same on the frame or stationary part of the retractor.

It is a further object of the invention to provide a novel clamping means which is mounted on the individual retractors to take the place of the commonly employed thumb screw clamp means, said clamp means being usually mounted on the frame of the retractor, instead of upon the individual retractors as provided for in this invention.

These and other and further objects, the nature of the invention, its composition and arrangement and combination of parts, will be clearly understood by anyone acquainted with the art to which this invention relates by referring to the following description, and the appended drawings, in which:

Figure 1 is a top perspective view of the assembled device.

Figure 2 is a bottom view of the circular retractor frame.

Figure 3 is an edge view of Figure 2.

Figure 4 is a sectional view on the line 4—4 of Figure 1, being a section of one of the feet or brace members for spacing and bracing the double ring of the retractor frame.

Figure 5 is a detailed view partly in section showing the arrangement and construction of the clamping means.

Figure 6 is a side view of one of the retractors.

Figure 7 is a partial view of the end of one of the retractors, of a different type from that shown in Figure 6.

Figure 8 is an end view from the left of Figure 7.

Figure 9 is a perspective view of the clamping pin.

Figure 10 is a perspective view of one of the members of the clamping mechanism.

Figure 11 is another form of the member as shown in Figure 10.

Figure 12 is a perspective view of the spring member of the clamping mechanism.

It is to be understood that I do not limit the application of this invention to the particular modification set forth herein in illustration thereof, and any change or changes may be made of material or structure consistent with the spirit and scope of the invention.

The circular retractor form comprises a pair of spaced flat bars 5, held in position and spaced by U-shaped brackets 6 bolted at equally spaced intervals to each of the bars on the underside thereof. The retractors comprise bars 7 having a downturned finger grip 8 at their outer ends and hooks 9, 9a and 9b respectively of different formation to be subsequently described.

The bars 7 of the retractor element are of flat form and are provided with longitudinal slots 10. Adapted to frictionally contact the bottom surfaces of the ring and to project up therebetween in a vertical direction and to be received in the slot 10 of the retractor element is a pin 11 having a crosshead 12 on its lower end.

The upper surfaces of the crosshead 12 are roughed as at 13 to form a strong frictional engagement with the lower surfaces of the bars 5, and the upper end of the pin 11 has a transverse hole 14. A handle clamp operating means is indicated at 15 and it has one end formed with a cam head 16 provided with a slot 17 across the top portion of which is arranged a pivot pin 18 for engagement through the hole 14 in the upper end of the pin 11 and the lower face or enlarged portion of the cam head 16 is adapted to engage against the spring 19 centrally apertured as at 20 to accommodate the pin 11 therethrough, the swinging of the handle 15 into horizontal position operating to depress said spring and raise said pin 11 so that the shoulders 13 engage the lower surfaces of the bars 5 and clamp the retractor member in position on said ring.

A support for said spring which operates as a guide for positioning said retractor members on the frame is shown in Figure 10 and Figure 11 and comprises a flat U-shaped construction having tapered ends, and the construction being generally designated by the numeral 21 and the upwardly projecting ends thereof at 22 and the tapered shoulders 23 and provided centrally in the upper portion of the projections 22 are square holes 24 for receiving the lateral projections 25 on the spring member 19, to position said spring member in proper relation to the clamp construction.

The type shown in Figure 10 differs from that shown in Figure 11 by the addition of longitudinal flanges 26 adapted to form a channel guide which engages over the rings of the frame, and prevents undesired lateral movement of some of the retractor elements.

The form shown in Figure 11 is not provided with said flanges 26 and permits a greater amount of lateral movement for some of the retractor elements.

The retractor elements are adapted to be drawn inwardly or outwardly from the center of the circular ring by means of the slot 10, the hand gripping the portion 8 for that purpose. It is obvious that by turning the handle 15 in tangential relation to the circular ring that the cross-head 12 on the pin 11 may be drawn upwardly through the space between said rings and the retractor element removed and the reverse operation places the crosshead in locking position adapted to be drawn up into clamping position by the vertical movement of the lever 15.

Different hooks 9, 9a and 9b are provided at the inner ends of the retractor members, the type designated 9 being flat curved pieces having rolled flanges for engaging the walls of the incision. the form 9b being similar to the form 9 except for the absence of the rolled flanges spoken of, and the form 9a being of special type construction of three interconnected bars forming a hook having a straight depending part and especially adapted to position the organs.

The form of guide support 21 shown in Figure 11 is used with the type of retractor shown in Figure 7 and designated 9a and also with the type designated 9b to permit a certain amount of lateral movement considered desirable when they are placed to support or retract the organs.

The form of support shown in Figure 11 is preferred to mount the form of hook designated 9 to retain the retractor member against any lateral movement when clamped in position. It is obvious that the spring clamp at 19 has the downwardly bent end portion 27 so that the central portion through which the aperture 20 is made is raised above the ends of said portion 27 to provide the necessary depressible spring action to secure the desired co-operation between the pin 11 and the cam lever 15.

It is thought that the operation and use of the device is obvious, and it will be thoroughly understood that from the foregoing description by anyone familiar with the art to which the invention relates, and it should be stated that the retractor elements are adjustable upon any position around the circular plane, the braces 6 being formed U-shaped, so as not to interfere with the placement of the retractor members at any point about the circumference of the ring, and that any number of the retractor members may be arranged around said circumference, and clamped thereto and that the abdominal wall retractors are provided with mechanism to clamp them in rigid relation to the frame, and that the organ retractor elements are clamped in any desired position about the circumference of the ring and are permitted a certain amount of lateral movement when clamped in position.

The form of the hook illustrated at 9b is a wide flat blade of the general configuration of Figure 7 and it is employed for a similar purpose as the blade shown in Figure 8 composed of the three interconnected bars designated 9a.

It will now be understood that I have provided a device of the character described, which embodies new principles of arrangement and construction, and provides new and novel features which enable a superior and a more efficient employment of a device of this kind, which is cheaply constructed, and which is highly convenient in use, and which contributes materially to the advancement of the art to which the invention relates.

I claim:

A device of the character described comprising a pair of concentric spaced rings having U-shaped spacers attached to the undersides thereof, a plurality of normally radially arranged retractor bars having a finger grip at one end and a retractor hook at the other end, said retractor hook being normally disposed within said pair of concentric rings, said retractor bars being provided with longitudinal slots, and a pin for each retractor bar adapted to pass in succession upwardly between the rings through a clamp slide, slidably engaging the upper surfaces of said pairs of rings and through the slot in said retractors, and through which spring plates on said slide and a cross head on the lower end of the pin adapted to be frictionally contacted with the under surfaces of said pair of rings, and a cam lever mounted on the upper end of the pin to cooperate with said spring plate to clamp said retractor bar while in adjusted positions on said pair of rings.

In testimony whereof I affix my signature.

HUBERT R. ARNOLD.